United States Patent
Chen et al.

(10) Patent No.: US 8,903,812 B1
(45) Date of Patent: Dec. 2, 2014

(54) QUERY INDEPENDENT QUALITY SIGNALS

(75) Inventors: Zhihui Chen, Menlo Park, CA (US); David P. Stoutamire, Redwood City, CA (US); Varun Kacholia, Sunnyvale, CA (US); Yu He, Sunnyvale, CA (US); Jonathan Frankle, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 536 days.

(21) Appl. No.: 12/944,179

(22) Filed: Nov. 11, 2010

Related U.S. Application Data

(60) Provisional application No. 61/293,109, filed on Jan. 7, 2010.

(51) Int. Cl.
*G06F 17/30* (2006.01)

(52) U.S. Cl.
USPC .......................................... 707/723

(58) Field of Classification Search
None
See application file for complete search history.

(56) References Cited

U.S. PATENT DOCUMENTS

| | | |
|---|---|---|
| 6,285,999 B1 | 9/2001 | Page |
| 6,345,252 B1 | 2/2002 | Beigi et al. |
| 6,829,005 B2 | 12/2004 | Ferguson |
| 6,931,201 B2 | 8/2005 | Obrador |
| 7,933,338 B1 | 4/2011 | Choudhry et al. |
| 8,185,543 B1 | 5/2012 | Choudhry et al. |
| 8,189,685 B1 | 5/2012 | Choudhry et al. |
| 8,498,487 B2 | 7/2013 | Singh |
| 2003/0095187 A1 | 5/2003 | Ferguson |
| 2004/0025180 A1 | 2/2004 | Begeja et al. |
| 2006/0161534 A1 | 7/2006 | Carson et al. |
| 2006/0218141 A1* | 9/2006 | Tuttle et al. .................. 707/5 |
| 2007/0130585 A1 | 6/2007 | Perret et al. |
| 2007/0180106 A1 | 8/2007 | Pirzada et al. |
| 2008/0250447 A1* | 10/2008 | Rowe et al. ................. 725/32 |
| 2009/0030800 A1 | 1/2009 | Grois |
| 2009/0083781 A1 | 3/2009 | Yang et al. |
| 2009/0147854 A1 | 6/2009 | Dane et al. |
| 2009/0148058 A1 | 6/2009 | Dane et al. |
| 2009/0164419 A1 | 6/2009 | Taylor et al. |
| 2010/0125871 A1 | 5/2010 | Liao et al. |
| 2010/0242060 A1* | 9/2010 | Liu et al. ...................... 725/9 |
| 2010/0318538 A1 | 12/2010 | Wyman et al. |
| 2011/0015989 A1* | 1/2011 | Tidwell et al. ............ 705/14.43 |
| 2012/0166435 A1 | 6/2012 | Graham |

OTHER PUBLICATIONS

Marko Ledvij, Curve Fitting Made Easy, 2008, http://web.archive.org/web/20080415132648/http://www.aip.org/tip/INPHFA/vol-9/iss-2/p24.html.*

Ledvij, M., "Curve fitting made easy", The Industrial Physicist, [online]. 2008 [retrieved on Dec. 31, 2012]. Retrieved from the Internet: <URL: http://web.archive.org/web/20080415132648/http://www.aip.org/tip/INPHFA/vol-9/iss-2/-p24.html>, 5 pgs.

* cited by examiner

*Primary Examiner* — Syed Hasan
(74) *Attorney, Agent, or Firm* — Fish & Richardson P.C.

(57) ABSTRACT

Methods, systems, and apparatus, including computer programs encoded on a computer storage medium, for processing video searches using query-independent quality scores.

24 Claims, 6 Drawing Sheets

FIG. 2A
FIG. 2B
FIG. 2C
FIG. 2D

QUERY INDEPENDENT QUALITY SIGNALS

CROSS-REFERENCE TO RELATED APPLICATIONS

Under 35 U.S.C. §119, this application claims benefit of U.S. Provisional Application Ser. No. 61/293,109, filed Jan. 7, 2010, the entire contents of which are hereby incorporated by reference.

BACKGROUND

This specification relates to digital information retrieval, and particularly to processing video resources to facilitate search operations.

Internet search engines provide information about Internet accessible resources (e.g., Web pages, images, sounds, text documents, multimedia content, and other content) that are responsive to a user's search query by returning a set of search results in response to the query. A search result includes, for example, a Uniform Resource Locator (URL) and a snippet of information for resources responsive to a query. The search results can be ranked (i.e., put in an order) according to scores assigned to the search results by a scoring function. The scoring function ranks the search results according to various signals, for example, where (and how often) query terms appear in the search results and how common the query terms are in the search results indexed by the search engine.

SUMMARY

In general, one innovative aspect of the subject matter described in this specification can be embodied in methods that include the actions of deriving a plurality of functions based on correlations between different data sets each representative of user interactions with different resources over a period of time; evaluating the functions for a specific resource and combining weighted results of the evaluations to create a quality signal for the resource; providing the quality signal to a ranking process for the resource when the resource is a search result for a query; and wherein deriving, evaluating and providing are performed by one or more data processing apparatus. Other embodiments of this aspect include corresponding systems, apparatus, and computer programs.

These and other aspects can optionally include one or more of the following features. A resource can be a video. A function in the plurality of functions can be a correlation between user ratings of the resources and watch times for the resources. A function in the plurality of functions can be a correlation between view counts for the resources and user ratings of the resources. A function in the plurality of functions can be a correlation between rankings of the resources and user ratings of the resources. The combining can produce a weighted sum. A function in the functions can be a sigmoid function. A weight in the weights can be calculated from a sigmoid function of one of the data sets wherein a data set comprises one of user ratings, watch times, view counts, and rankings. The deriving can comprise fitting a curve to a correlation between two different data sets.

Particular embodiments of the subject matter described in this specification can be implemented to realize one or more of the following advantages. The quality of a video, as determined by feature analysis and user feedback, is used to limit the number of videos that are selected for scoring for a search operation, and thus fewer processing resources are required to process a search operation. The quality of the video can also be used to adjust a relevance score of the video that is used to determine a ranking of a corresponding search for the video relative to search results to other videos, and thus separate quality scores for selecting the videos for scoring and for scoring the videos are not required. A validation process validates a predictor model based on a positive correlation of quality score to user feedback, thus ensuring the predictor model correlates with the subjective tastes of the users. A quality function is derived that determines a query-independent quality signal for a video or other content based on noisy input signals. Input signals to the quality function can be based on user feedback and can include false data such as "spam". The quality function suppresses noise and "spam" and can also be derived based on small sample data sets.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is an example plot correlating average user ratings to the natural logarithm of median average watch times for a set of videos.

FIG. 2B is an example plot correlating the natural logarithm of median watch times to average user ratings for a set of videos.

FIG. 2C is an example plot correlating the natural logarithm of view counts to average user ratings for a set of videos.

FIG. 2D is an example plot correlating average ranks to average user ratings for a set of videos.

Like reference numbers and designations in the various drawings indicate like elements.

DETAILED DESCRIPTION

Figure 1A:
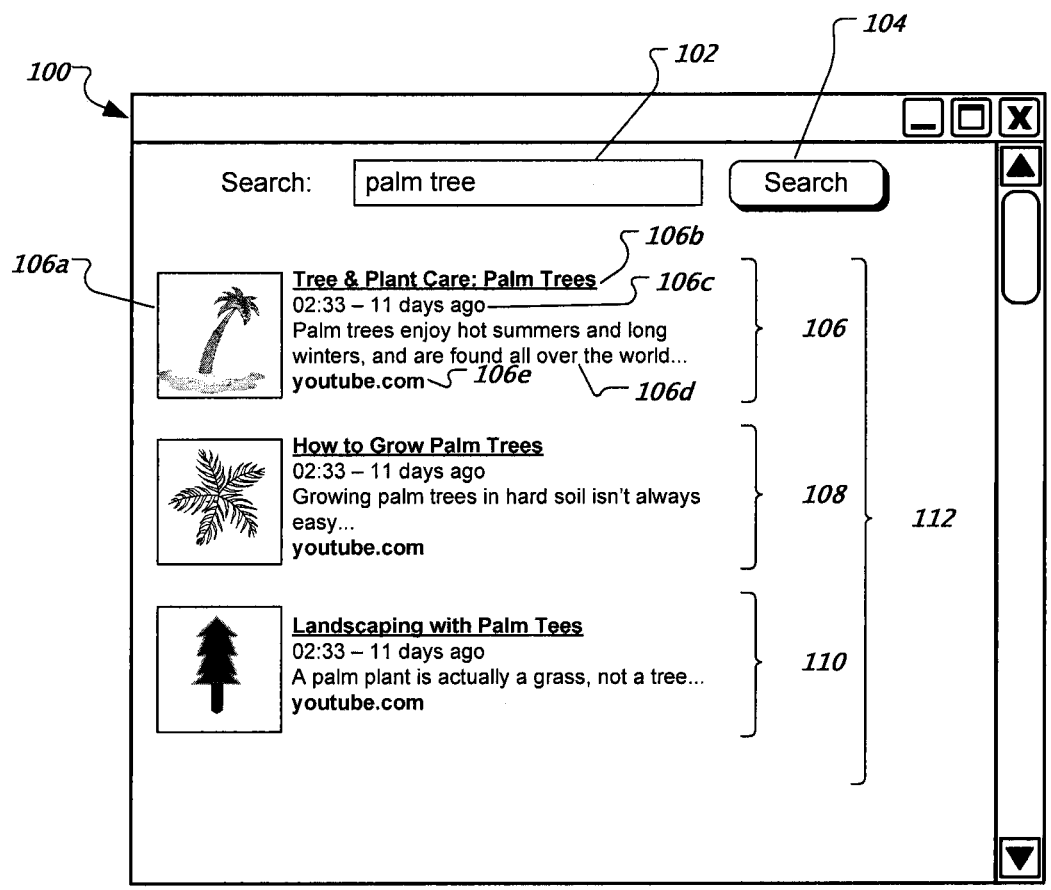
FIG. 1A illustrates video search results as displayed in an example web page as presented in a web browser or other software application.

FIG. 1A illustrates video search results as displayed in an example web page 100 as presented in a web browser or other software application. The web page 100 includes a text entry field 102 which accepts queries from users when a search button 104 is selected, for instance. Queries are text (e.g., "palm tree") or speech that specifies general or specific video topics or other information. Alternatively, queries can comprise images or videos. A submitted query is transmitted to a search engine which identifies videos that are responsive to the query in an index of resources (e.g., web pages) of the world wide web or other corpus and then transmits video search results 106, 108 and 110 to the web browser for presentation in region 112 of the web page 100. As used herein, resource is any data that can be provided by a website over a network and that is associated with a resource address. Resources include HTML pages, word processing documents, and portable document format (PDF) documents, images, videos, electronic games, and feed sources, to name just a few. The resources can include content, e.g., words, phrases, images and sounds and may include embedded information (e.g., meta information and hyperlinks) and/or embedded instructions (e.g., JavaScript scripts).

Each search result can include summary information such as a representative frame from the video (e.g., frame 106a), the video's title (e.g., title 106b), a textual summary (e.g., synopsis 106d), the running time of the video (e.g., time data 106c), and a Uniform Resource Locator (URL) or other identifier specifying the location of the video (e.g., identifier 106e). In some implementations, time data 106c includes duration and the date on which the video was uploaded. Other search result information is possible. A video may be stored at the location (e.g., identifier 106e) in a portion of a file that holds other content, in a single file dedicated to the video in question, or in multiple coordinated files. A video may, but need not, correspond to a file. A user can select a search result (e.g., frame 106a or identifier 106e) with a mouse click, a finger gesture on a touch-sensitive surface, a speech command to a microphone, or by way of another input device, for example, in order to play the video identified by the search result.

Search results 112 can be ranked according to traditional techniques for determining an information retrieval (IR) score for indexed resources that contain videos in view of a given query. The relevance of a particular resource with respect to a particular search term or other provided information may be determined by any appropriate scoring technique.

Figure 1B:
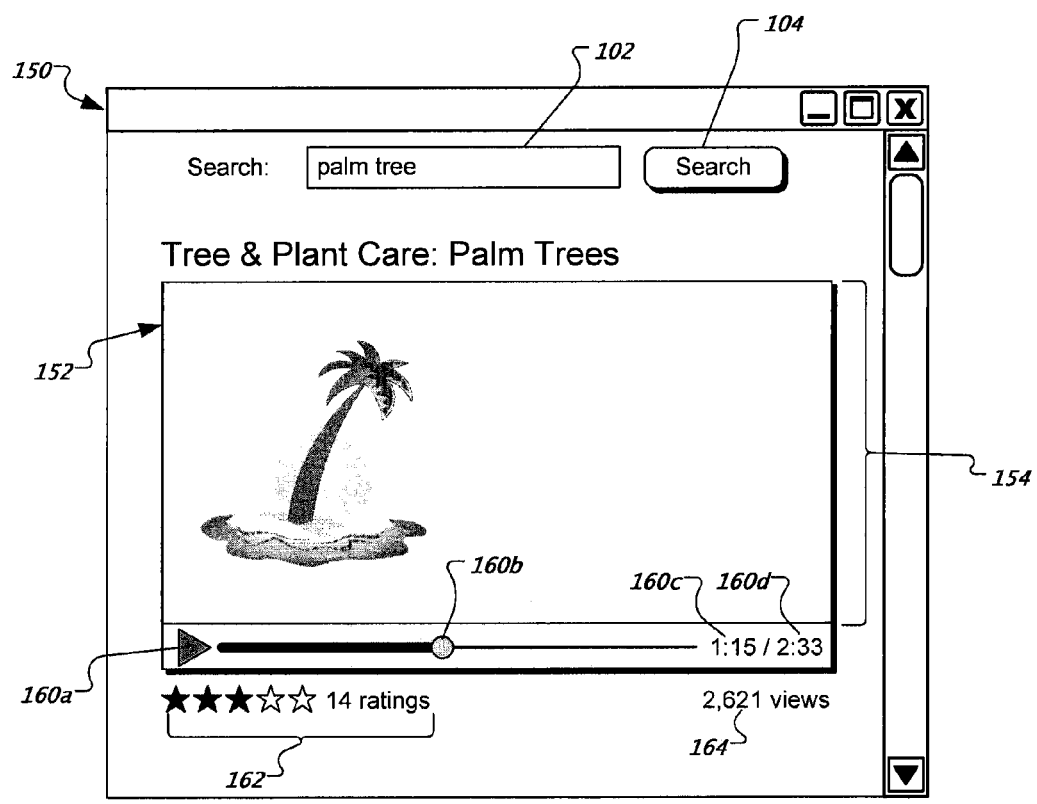
FIG. 1B illustrates an example video player as displayed in an example web page as presented in a web browser or other software application.

FIG. 1B illustrates an example video player as displayed in an example web page 150 as presented in a web browser or other software application. In some implementations, the video player is a stand-alone software application. The video player includes a playback window 152 for displaying a video. Different video formats are possible including, but not limited to, HD, HDV, DVD, Blu-Ray, HD-DVD, HD-VMD, CH-DVD, HDTV, Adobe Systems Incorporated Flash, MPEG, MPEG-4, and Apple Inc. Quicktime. A play button 160a starts and pauses the video playback while a progress bar indicator 160b indicates how much of the video has been played. The current time offset into the playback is displayed at 160c and the total running time of the video is displayed at 160d. In this illustration, the offset is 1 minute and 15 seconds, and the total running time is 2 minutes and 33 seconds. A rating 162 indicates the average rating (e.g., three out of five stars) of all user ratings of the video and the total number of ratings (e.g., fourteen). By way of illustration, a video rating system can have rating values of one, two, three, four or five stars, with one star indicating strong dislike and five stars indicating strong enjoyment on the part of the user rating the video. Other rating systems are possible, however. The total number of users who have viewed the video (or "view count") 164 in part or in its entirety is also presented. As used herein, the term "view" means that the video is played back on a user device without interruption, e.g., without navigating to another web page, or causing the browser window in which the video is being played back to become an inactive window. Other definitions can also be used.

In various implementations, a system described below with reference to FIG. 3, maintains user ratings, watch times, and view counts for videos. Each time a user rates a video, the rating is logged as a rating for the video. Each time a user watches a video, the amount of time that the video was played is logged as a watch time for the video. In some implementations, the watch time for a video is the total time users spent watching the video. In further implementations, the watch time for a video is accumulated regardless of whether the users watched portions of the video out of sequence, skipped portions, or viewed a portion more than once. If the watch time for a video is not known (e.g., because the video is not hosted by a system that keeps track of user watch times), the watch time can be estimated based on when users navigate off of the web page for the video. For example, a web browser plug-in or other software can monitor when users navigate off of web pages and record this information. If the system hosting the video does not programmatically provide a view count for the video (e.g., through an application programming interface), the view count can be detected by a plug-in or other software that analyzes the web page for text indicating the view count, for example.

In some implementations, the system can also determine a query-independent rank for a video. For example, the world wide web's link structure can be used to determine a video's rank. A link (e.g., hyperlink) from resource A to resource B which contains a video is interpreted as a vote, by resource A, for resource B. In addition to the volume of votes, or links a resource receives, the resource that casts the vote is also considered. Votes cast by resources that are themselves "important" weigh more heavily and help to make other resources "important". If the pointing resources are in turn the targets of links from other important resources, they can be considered more "important", and the first resource can be considered particularly important because it is the target of important (or even highly relevant) resources. Such a technique may be the determinant of a resource's importance or one of multiple determinants. Appropriate techniques can also be taken to identify and eliminate attempts to cast false votes so as to artificially drive up the importance of a video.

Signals such as user ratings, watch times, view counts, ranks for videos, and other signals, can be used to derive a query independent quality signal Q for video. In various implementations, Q is calculated as a weighted sum:

$$Q = \sum_{i=1}^{k} \frac{P(s_i) \cdot V(s_i)}{B(s_i)}$$

where k is the number of input signals, P is a predictor function for the input signal $s_i$, V is a voting function (or weight) for the input signal $s_i$, and B represents the sample base of the input signal $s_i$. Other forms of Q are possible.

In various implementations, the predictor function P is a general sigmoid predictor function for an input signal s (e.g., average user rating, watch time, view count, or rank) which fits a correlation of the input signal s to another signal, referred to as a "ground truth":

$$P(s) = \frac{P_1}{(1 + e^{P_2 \cdot x - P_3})} + P_4$$

where P1, P2, P3 and P4 are constants that move the sigmoid function to fit a correlation curve for each input signal s, and where x is the value of s used in the function. In some implementations, the value of x is as indicated in TABLE I. (Note: "ln" denotes the natural logarithm.) However, other values of x are possible. Other forms of P are possible including non-sigmoid forms.

TABLE 1

| SIGNAL S | VALUE OF X |
| --- | --- |
| View Count | ln (View Count) |
| Watch Time | ln (Watch Time) |
| Rating | Rating |
| Score | Score |
| Total Running Time | ln (Total Running Time) |

By way of illustration, the predictor function P can be used to fit the correlations between data sets depicted in FIGS. 2A-D. In some implementations, results from different videos in bins within the same range of the x-axis are clustered and represented as one point with the average or median x value of the bin and the average or median of the clustered results' y-axis values are plotted in FIGS. 2A-D. FIG. 2A is an example plot correlating the average user ratings in each bin to the natural logarithm of median average watch times in each bin for a set of videos. FIG. 2B is an example plot correlating the natural logarithm of median user watch times in each bin to average user ratings in each bin for a set of videos. FIG. 2C is an example plot correlating the natural logarithm of view counts in each bin to average user ratings in each bin for a set of videos. And FIG. 2D is an example plot correlating average ranks in each bin to an average user ratings in each bin for a set of videos. Others correlations are possible, such as video length to average user rating, and so on.

The voting function V measures the overall variance of the predictor function P. In some implementations, V is defined as a general sigmoid function:

$$V(s) = \frac{V_1}{(1 + e^{V_2 \cdot x - V_3})} + V_4$$

where V1, V2, V3 and V4 are constants that move the sigmoid function to fit a curve for each input signal s, and where x is the sample base of the signal s. Other forms of V are possible, including non-sigmoid forms. In some implementations, the value of x is as indicated in TABLE 2.

TABLE 2

| SIGNAL S | VALUE OF X |
| --- | --- |
| View Count | 1 |
| Watch Time | ln (View Count) |
| Rating | ln (Number of Raters) |
| Rank | 1 |
| Total Running Time | 1 |

In further implementations, other input signals are possible. For example, a raters per view signal is calculated as the number of users who have rated a video divided by the number of times a video has been viewed. If raters per view is too large (e.g., >1/400), this implies that there is potentially spam activity (e.g., click spam which artificially raises the rating of a video). In order to counteract the effects of spam, the number of raters can be artificially reduced. In some implementations, the following formula can be used to reduce the number of raters:

$$\text{raters}' = \text{raters} \cdot \left(\frac{0.0025}{\text{ratersperview}}\right)^{\text{penalty}}$$

where the penalty is 2, for instance. For example, if there are 4,000 views and 20 raters (i.e., a raters per view equal to 0.005), using the above formula raters' would be 20×0.5² or 5. Recalculating raters per view using raters' results in a value of 0.00125 rates per view.

Another possible signal is provider credit which is the average rating of all videos uploaded by a provider excluding top ratings (e.g., 5 star ratings). In order to counteract the effects of spam for this signal, the video ratings can be weighted by the raters per view anti-spam technique described above. A further technique for counteracting spam is to ignore ratings where the corresponding watch time is short.

In further implementations, Q, P and V functions can be derived for resources other than videos where user ratings and user behavior towards the resource content (e.g., time spent with the content) come into play. For example, other resources can include audio content (e.g., music, newscasts, podcasts, sports events, shows, audio books), streamed television or other video content, electronic games, and web pages.

Figure 3:
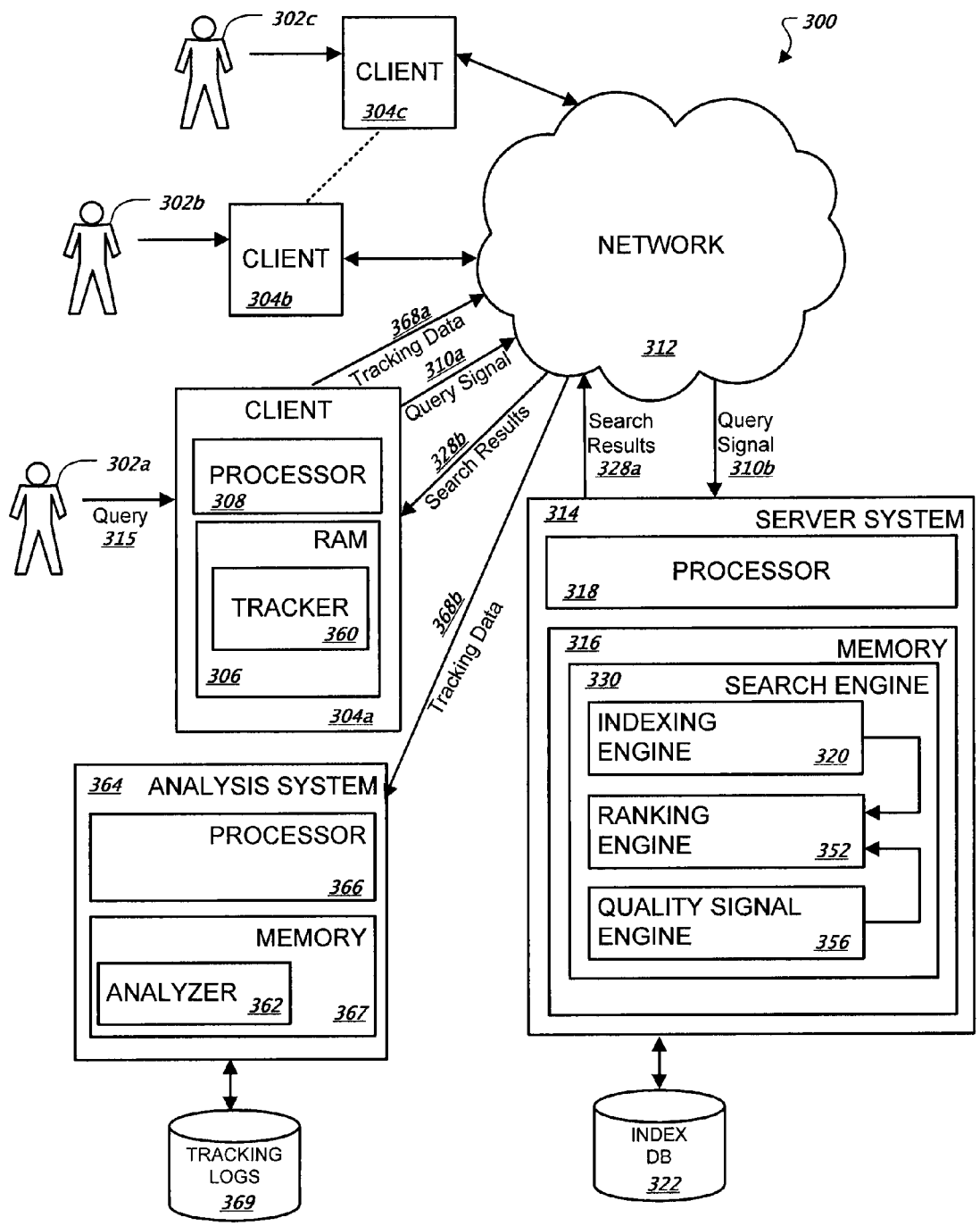
FIG. 3 illustrates an example search system for identifying search results in response to search queries as can be implemented in an Internet, intranet, or other client/server environment.

FIG. 3 illustrates an example search system 300 for identifying search results in response to search queries as can be implemented in an Internet, intranet, or other client/server environment. The system 300 is an example of an information retrieval system in which the systems, components and techniques described herein can be implemented. Although several components are illustrated, there may be fewer or more components in the system 300. Moreover, the components can be distributed on one or more computing devices connected by one or more networks or other suitable communication mediums.

A user 302 (302a, 302b, 302c) interacts with the system 300 through a client device 304 (304a, 304b, 304c) or other device. For example, the client device 304 can be a computer terminal within a local area network (LAN) or wide area network (WAN). The client device 304 generally includes a random access memory (RAM) 306 (or other memory and/or a storage device) and a processor 308. The processor 308 is structured to process instructions on the client device 304. The processor 308 is a single or multi-threaded processor having one or more processor cores, for example. The processor 308 is structured to process instructions stored in the RAM 306 (or other memory and/or a storage device included with the client device 304) to display graphical information for a user interface.

The RAM 306 on the client device 304 includes a tracker software program 360 for keeping count of views, watch times, and user ratings of videos on the client device 304. The tracker 360 can send the tracked data as a client-side signal 368a into the network 312 (e.g., the Internet or other network). The data is forwarded to an analysis system 364 as a server-side signal 368b. The analysis system 364 generally includes a RAM 367 (or other memory and/or a storage device) and a processor 366. The processor 366 is structured to process instructions on the analysis system 364. The processor 366 is a single or multi-threaded processor having one or more processor cores, for example. The RAM 367 includes an analyzer software program 362 for analyzing the tracking data 368b in order to derive or update predictor and voting functions. The tracking data 368b can be stored in one or more tracking logs 369 which are used to record the collected information for multiple users and videos. In various implementations, the recorded information includes log entries that indicate the IP (Internet Protocol) address of the client 304 which transmitted the information, the type of data (e.g., view count, watch time, user rating), and a value for the data.

A user 302a connects to the search engine 330 within a server system 314 to submit a query 315. When the user 302a submits the query 315 through an input device attached to a client device 304a, a client-side query signal 310a is sent into the network 312 and is forwarded to the server system 314 as a server-side query signal 310b. Server system 314 can be one or more server devices in one or more locations. A server device 314 includes a memory device 316, which can include the search engine 330 loaded therein. A processor 318 is structured to process instructions within the device 314. These instructions can implement one or more components of the search engine 330. The processor 318 can be a single or multi-threaded processor and can include multiple processing cores. The processor 318 can process instructions stored in the memory 316 related to the search engine 330 and can send information to the client devices 304a-c, through the network 312, to create a graphical presentation in a user interface of the client device 304 (e.g., a search results web page displayed in a web browser).

The server-side query signal 310b is received by the search engine 330. The search engine 330 uses the information within the user query 315 (e.g. query terms) to find relevant resources (e.g., videos). The search engine 330 can include an indexing engine 320 that actively searches a corpus (e.g., web pages on the Internet) to index the resources found in that corpus, and the index information for the resources in the corpus can be stored in an index database 322. This index database 322 can be accessed to identify resources related to the user query 315. Note that, an electronic resource (which for brevity will simply be referred to as a resource) does not necessarily correspond to a file. A resource can be stored in a portion of a file that holds other resources, in a single file dedicated to the resource in question, or in multiple coordinated files. Moreover, a resource can be stored in a memory without having first been stored in file.

The search engine 330 includes a ranking engine 352 to rank the resources related to the user query 315 using a scoring or ranking function. The ranking of the resources can be performed using traditional techniques for determining an information retrieval (IR) score for indexed resources in view of a given query, for example. The relevance of a particular resource with respect to a particular search term or to other provided information may be determined by any appropriate technique.

To further improve such traditional resource ranking techniques, the ranking engine 352 receives quality signals from a quality signal engine 356 to assist in determining an appropriate ranking for video search results. In some implementations, the quality signal engine 356 calculates the quality signal on the fly using the predictor and voting functions derived by the analyzer 362. Alternatively, the quality signal can be calculated for videos ahead of time so that the quality signal engine 356 only needs to look up the value for a given video.

The search engine 330 forwards the final, ranked result list within a server-side search results signal 328a through the network 312. Exiting the network 312, a client-side search results signal 328b is received by the client device 304a where the results are stored within the RAM 306 and/or used by the processor 308 to display the results on an output device for the user 302a. The server system 314 may also maintain one or more user search histories based on the queries the server system 314 receives from a user, and from results that a user selected after a search was performed.

The components shown in FIG. 3 can be combined in various manners and implemented in various system configurations. For example, the analyzer 362 and the quality signal engine 356 can be combined into a single component on the analysis system 364 or the server system 314. The quality signal engine 356 and the ranking engine 352 can also be merged, and in general, a ranking engine includes any software component that generates a ranking of video results after a query. Moreover, a ranking engine can be included in a client system in addition to (or rather than) in a server system.

Figure 4:
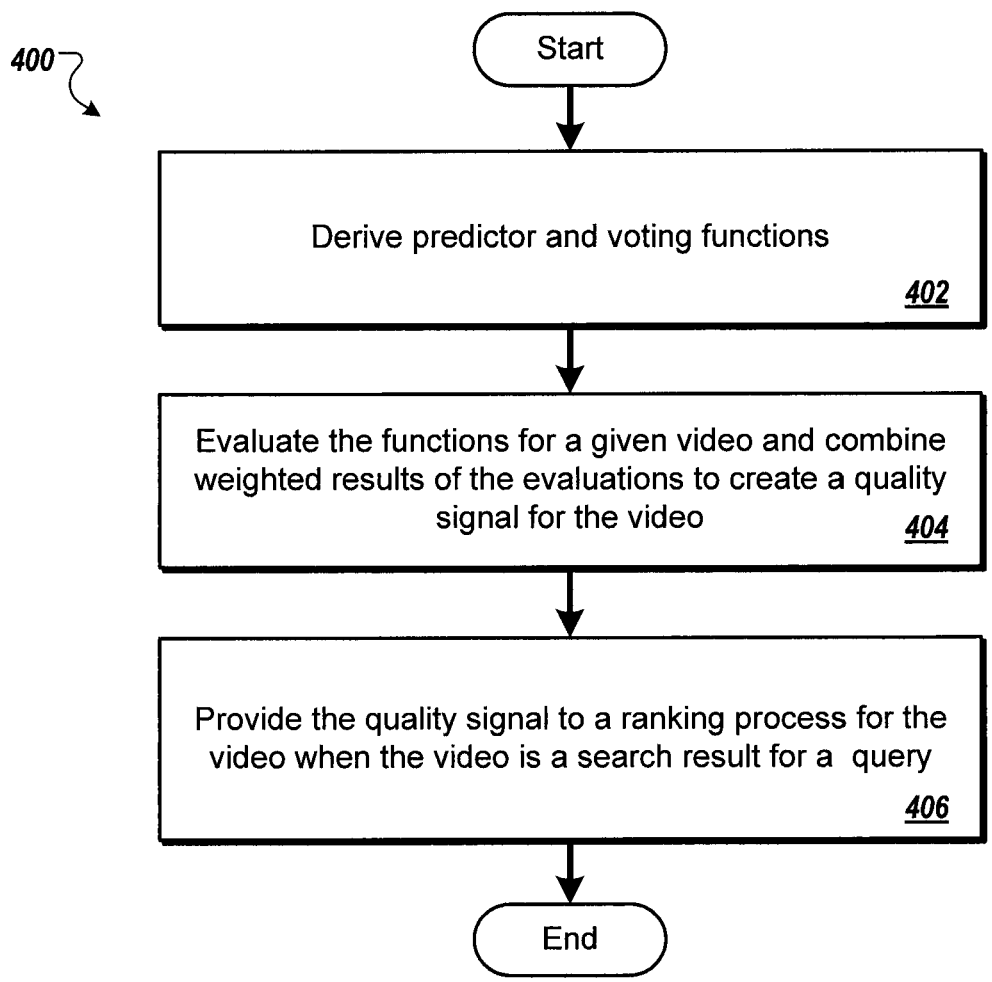
FIG. 4 is a flow diagram of an example technique for providing a quality signal.

FIG. 4 is a flow diagram of an example technique 400 for providing a quality signal. A plurality of functions (e.g., predictor and voting functions) are derived based on correlations between different data sets (e.g., watch time, user rating, views) each representative of user interaction with videos over a period of time (402). The function derivation can be performed by the analysis system 364, for example. The functions are then evaluated for a specific video result and the evaluations are weighted and combined to create a quality signal for the video (404) by the analysis system 364 or the quality signal engine 356, for instance. The quality signal is then provided to a ranking process (e.g., ranking engine 352) for the video when the video is a search result for a query (406). By way of illustration, if a client device such as 304a submits a query signal 310a to the server system 314 containing the query "palm tree", the search engine 330 will identify relevant videos using the indexing 322 and then the ranking engine 352 will accept quality signals from the quality signal engine 356 in order to assist in ranking the identified videos.

Figure 5:
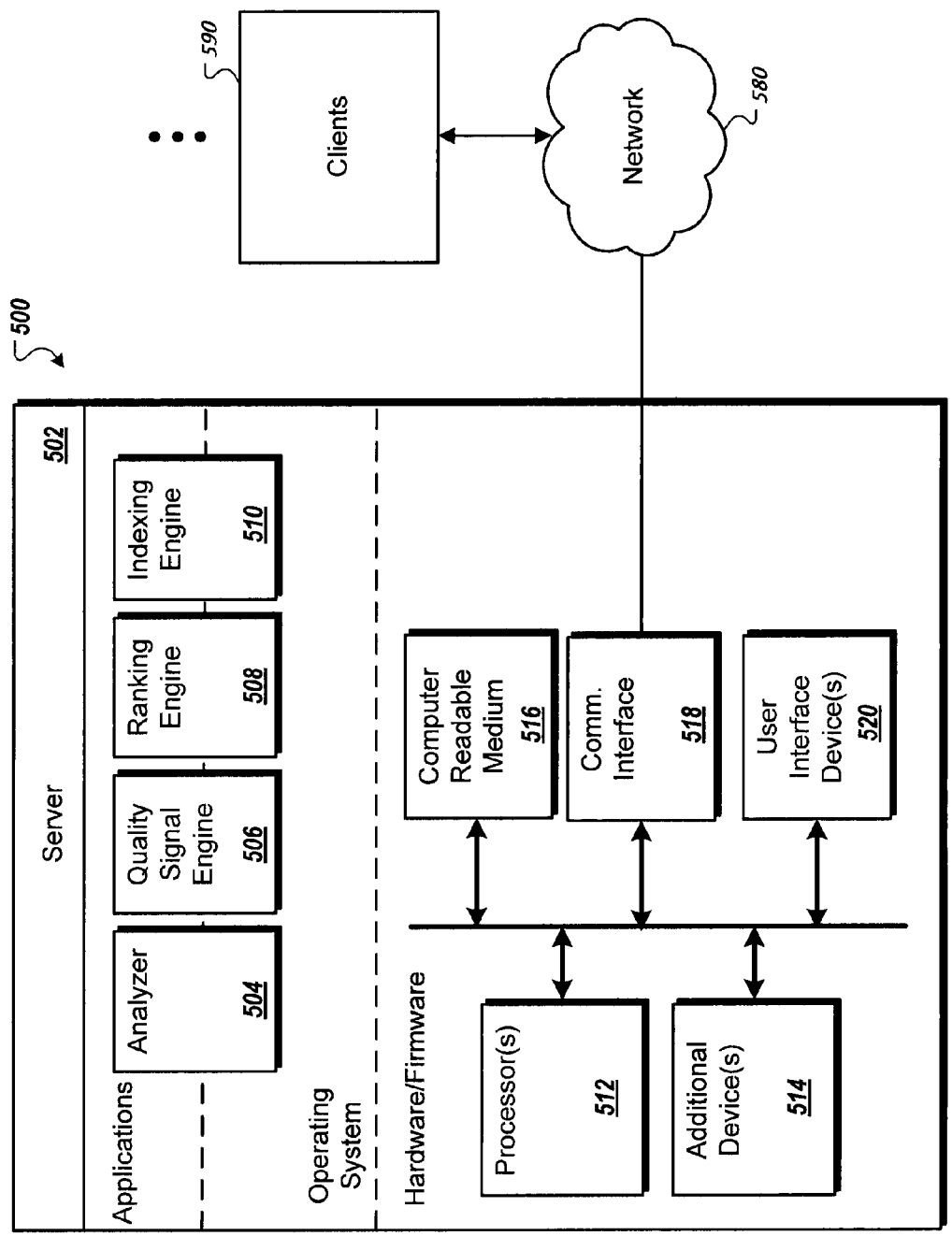
FIG. 5 is a schematic diagram of an example system configured to derive a quality signal.

FIG. 5 is a schematic diagram of an example system configured to derive a quality signal. The system generally consists of a server 502. The server 502 is optionally connected to one or more user or client computers 590 through a network 580. The server 502 consists of one or more data processing apparatuses. While only one data processing apparatus is shown in FIG. 5, multiple data processing apparatus can be used. The server 502 includes various modules, e.g. executable software programs, including an analyzer 504 for analyzing the tracking data in order to derive or update predictor and voting functions. A quality signal engine 506 is configured to calculate the quality signal of a video on the fly using the predictor and voting functions derived by the analyzer 504. Alternatively, the quality signal can be calculated for videos ahead of time so that the quality signal engine 506 only needs to look up the value for a given video. A ranking engine 508 ranks videos responsive to a query which were identified using one or more indexes maintained by the indexing engine 510. The ranking engine 508 can use the quality signal provided by the quality signal engine 506 as an additional input to a ranking algorithm.

Each module runs as part of the operating system on the server 502, runs as an application on the server 502, or runs as part of the operating system and part of an application on the server 502, for instance. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    determining a correlation between respective watch times of a plurality of first videos with respective user ratings of the plurality of first videos;
    deriving a prediction function for the correlation wherein the prediction function models the correlation;
    deriving a variance function for the prediction function wherein the variance function models variance of the prediction function;
    deriving a quality signal function based on, at least, the prediction function and the variance function;
    determining a respective quality signal for each video in a plurality of second videos using the quality signal function;
    providing the respective quality signals to a ranking process for the second videos for use when ranking the second videos in response to a received query; and
    wherein deriving, determining and providing are performed by one or more data processing apparatuses.

2. The method of claim 1 wherein each respective watch time is a median watch time that users watched a given video and wherein each respective user rating is an average of user ratings for the given video.

3. The method of claim 1 wherein the quality signal function is further based on a correlation between respective view counts and the respective user ratings of the first videos.

4. The method of claim 1 wherein the quality signal function is further based on a correlation between respective video rankings and the respective user ratings of the plurality of first videos.

5. The method of claim 1 wherein the prediction function is weighted by the variance function.

6. The method of claim 1 wherein the prediction function is a sigmoid function.

7. The method of claim 1 wherein the variance function is a sigmoid function.

8. The method of claim 1 wherein determining the respective quality signal for each video in the plurality of second videos comprises providing a watch time or user rating for the second video as input to the quality signal function.

9. A system comprising:
    data processing apparatus programmed to perform operations comprising:
        determining a correlation between respective watch times of a plurality of first videos with respective user ratings of the plurality of first videos;
        deriving a prediction function for the correlation wherein the prediction function models the correlation;
        deriving a variance function for the prediction function wherein the variance function models variance of the prediction function;
        deriving a quality signal function based on, at least, the prediction function and the variance function;
        determining a respective quality signal for each video in a plurality of second videos using the quality signal function; and
        providing the respective quality signals to a ranking process for the second videos for use when ranking the second videos in response to a received query.

10. The system of claim 9 wherein each respective watch time is a median watch time that users watched a given video and wherein each respective user rating is an average of user ratings for the given video.

11. The system of claim 9 wherein the quality signal function is further based on a correlation between respective view counts and the respective user ratings of the first videos.

12. The system of claim 9 wherein the quality signal function is further based on a correlation between respective video rankings and the respective user ratings of the plurality of first videos.

13. The system of claim 9 wherein the prediction function is weighted by the variance function.

14. The system of claim 9 wherein the prediction function is a sigmoid function.

15. The system of claim 9 wherein the variance function is a sigmoid function.

16. The system of claim 9 wherein determining the respective quality signal for each video in the plurality of second videos comprises providing a watch time or user rating for the second video as input to the quality signal function.

17. A program product encoded on a non-transitory computer readable medium including instructions that, when executed by data processing apparatus, cause the data processing apparatus to perform operations comprising:

determining a correlation between respective watch times of a plurality of first videos with respective user ratings of the plurality of first videos;

deriving a prediction function for the correlation wherein the prediction function models the correlation;

deriving a variance function for the prediction function wherein the variance function models variance of the prediction function;

deriving a quality signal function based on, at least, the prediction function and the variance function;

determining a respective quality signal for each video in a plurality of second videos using the quality signal function; and providing the respective quality signals to a ranking process for the second videos for use when ranking the second videos in response to a received query.

18. The program product of claim 17 wherein each respective watch time is a median watch time that users watched a given video and wherein each respective user rating is an average of user ratings for the given video.

19. The program product of claim 17 wherein the quality signal function is further based on a correlation between respective view counts and the respective user ratings of the first videos.

20. The program product of claim 17 wherein the quality signal function is further based on a correlation between respective video rankings and the respective user ratings of the plurality of first videos.

21. The program product of claim 17 wherein the prediction function is weighted by the variance function.

22. The program product of claim 17 wherein the prediction function is a sigmoid function.

23. The program product of claim 17 wherein the variance function is a sigmoid function.

24. The program product of claim 17 wherein determining the respective quality signal for each video in the plurality of second videos comprises providing a watch time or user rating for the second video as input to the quality signal function.

* * * * *